Patented Dec. 3, 1940

2,223,973

UNITED STATES PATENT OFFICE 2,223,973

METHOD OF PREVENTING MIST ABOVE THE SURFACE OF AN ELECTROLYTE EVOLVING GAS

Roscoe Teats, Denver, Colo., assignor to American Smelting & Refining Company, New York, N. Y., a corporation of New Jersey No Drawing. Application June 16, 1932, Serial No. 617,682

5 Claims. (Cl. 204—1)

This invention relates to the electro-deposition of metals, especially cadmium, and particularly concerns a method for preventing the formation and liberation of mist above the surface of the electrolyte.

In the electro-deposition of metals by ordinary methods, it not infrequently happens that a mist or spray is evolved from the surface of the electrolyte. This is due to the formation of bubbles of gas either on the anodes or cathodes, or both, depending on the particular process, which, when they reach the surface of the electrolyte, burst and form the undesired mist. This mist may, as in the electro-deposition of cadmium using insoluble anodes, be sufficient to contaminate the atmosphere and render it difficult for operators to work in the tank house for any extended period of time.

By my invention it is possible to prevent this mist arising from the surface of the electrolyte with the result that a mist-free atmosphere may be maintained over the electrolyte and in the operating plant. I have found that by adding certain substances to the electrolyte a stable froth or foam may be maintained upon the surface thereof which eliminates entirely, or at least reduces to a minimum, the mist which normally would form and contaminate the atmosphere but for the occlusion of the gases by the froth or foam layer as the gases emerge from the surface of the electrolyte.

As an explanation of this mist preventing property of certain organic froth producing agents or substances, I believe the desired effect is probably due to the decreased surface tension and the increased viscosity of the liquid film surrounding the gas bubbles. Insofar as these be the correct hypotheses, it follows that the stability of the froth or foam will be determined by the extent to which the viscosity and surface tension of the liquid film are respectively increased and decreased.

While any froth or foam producing substance may be used, which yields the desired stable froth or foam and is not detrimental to the electrolytic process, I have found that certain cereal or cereal products give the desired result. For example, the roasted cereal product which is sold on the market under the trade name of "Instant Postum" produces an excellent and stable froth or foam, which prevents the evolution of mist from the surface of the electrolyte.

While I prefer to use this manufactured product, I have prepared a suitable froth producing agent by mixing approximately equal parts of whole wheat flour and bran, adding a quantity of cane sugar molasses, together with sufficient water to make a stiff paste, and baking the mixture. I have found that ten to twenty parts each of whole wheat flour and bran, to one to three parts of molasses, mixed with sufficient water, results in a suitable mixture. This mixture is then baked until it shows a rich, dark brown color, after which it is ground to any desired degree of fineness. This forms an excellent foam producing agent and may be added to the electrolytic bath in this form. However, instead of grinding, an extract may be prepared by leaching with water and the liquid extract added to the electrolyte. A highly novel and extremely practical advantage to be gained by the use of the extract form of the frothing agent resides in the fact that a clear solution results.

The amount of baked cereal, or other froth producing agent, required to produce the necessary quantity of foam, is relatively small, as I am enabled to eliminate the mist arising from a cadmium electrolyte by the use of substantially one pound of baked cereal mixture, for example, of the "Instant Postum" type, to 2000 to 3000 gallons of a cadmium electrolyte, comprising an aqueous solution of cadmium sulphate and sulphuric acid in the approximate proportions of 125 grams cadmium and 25 grams sulphuric acid (approximately 63° Bé.) per litre of electrolyte.

It will thus be appreciated that my invention may be practiced in various types of electrolytic cells evolving gas and that the frothing agent may be added to the electrolyte at any time although it should be added at the start of the electrolytic process in order to form the stable froth layer and thereby prevent mist from arising at the beginning of the operation.

As herein applied to the description of a froth or foam, the word "stable" is used to denote one that will persist for an extended period of time independently of the evolution of gas from the electrolyte in contrast to those of the prior art that are transitory or evanescent and disappear within a relatively short time upon cessation of gas evolution.

This application is related to the co-pending application of Roscoe Teats and Rudolph Leonard Hasche, Serial No. 323,558, filed December 3, 1928, which subsequently issued as Patent No. 1,931,854 on October 24, 1933.

What is claimed is:

1. The method of preventing liberation of spray or mist from the surface of an electrolyte in an electrolytic cell evolving gas which consists in adding a frothing agent to the electrolyte so as to form a layer of stable froth on the surface of an electrolyte occluding the gas.

2. The process for depositing cadmium from an acidified cadmium sulphate solution which consists in electrolyzing said solution, using insoluble anodes, and adding sufficient Instant Postum to the solution to form a stable froth and occlude gases evolved from the solution during electrolysis.

3. The process for producing cadmium which comprises electrolyzing with an insoluble anode, an acidified cadmium sulphate bath containing a baked or roasted cereal mixture of whole wheat flour, bran and cane sugar molasses.

4. The process for producing cadmium which comprises electrolyzing with insoluble anodes, an acidified cadmium sulphate bath to which an aqueous extract of a baked or roasted mixture of whole wheat flour, bran and cane sugar molasses has been added.

5. The process for operating an electrolytic cell evolving gas to prevent contamination of the atmosphere above the cell with spray or mist, said cell containing acid electrolyte and insoluble anodes, which comprises incorporating a reagent in the electrolyte yielding, upon the surface thereof, a layer of froth or foam that is stable or permanent in that it will persist for an extended period of time independently of the evolution of gas from the electrolyte as contrasted to a transitory or evanescent one that will disappear within a relatively short period of time upon cessation of evolution of gas from the electrolyte.

ROSCOE TEATS.